R. J. HAVERTY & A. ECKENROD.
KITCHEN UTENSIL.
APPLICATION FILED SEPT. 19, 1912.
1,106,809.
Patented Aug. 11, 1914.
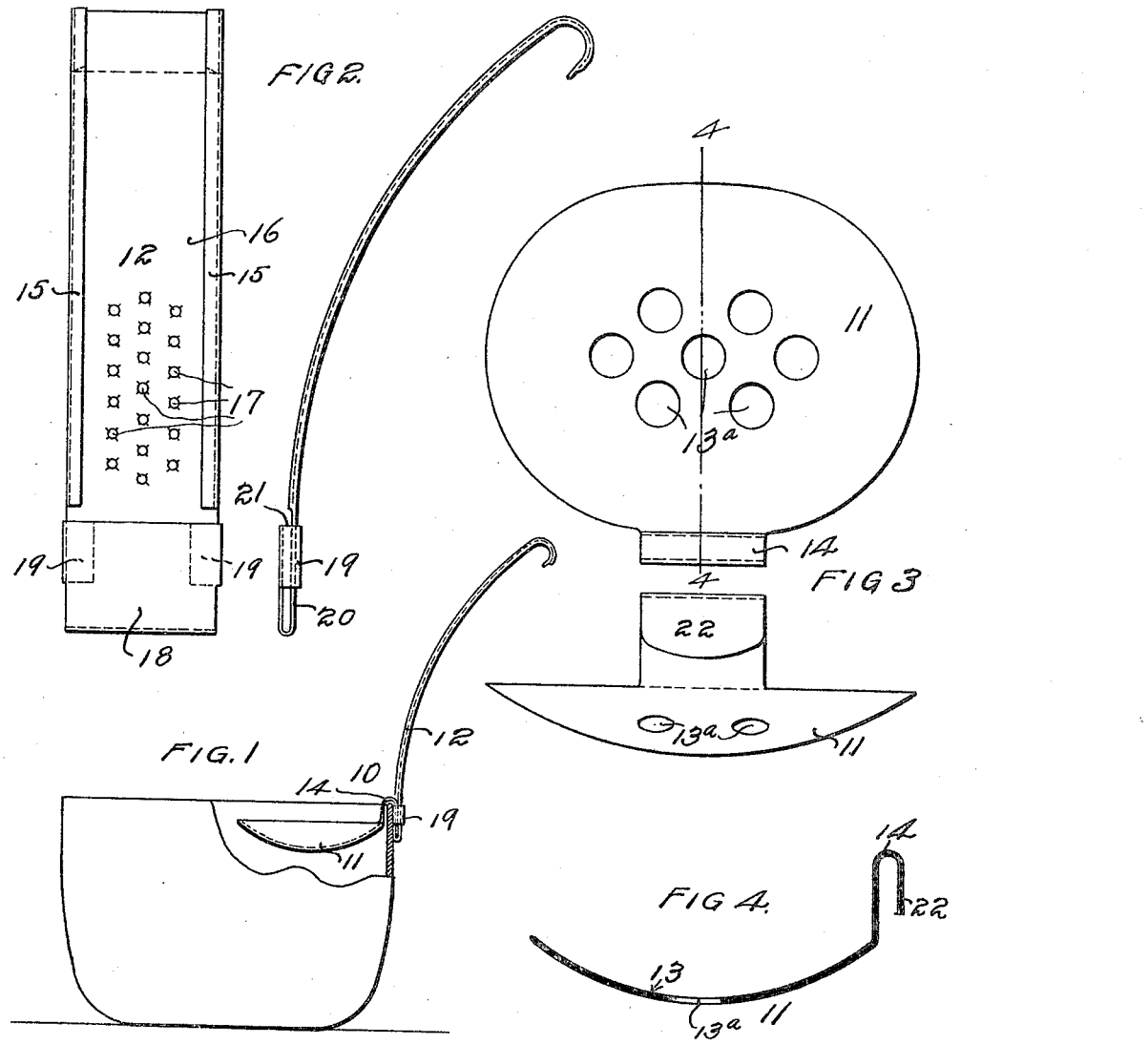

UNITED STATES PATENT OFFICE.

RAYMOND J. HAVERTY AND ANNIE ECKENROD, OF ALTOONA, PENNSYLVANIA, ASSIGNORS OF ONE-THIRD TO WILLIAM THOMAS HAVERTY, OF ALTOONA, PENNSYLVANIA.

KITCHEN UTENSIL.

1,106,809. Specification of Letters Patent. Patented Aug. 11, 1914.

Application filed September 19, 1912. Serial No. 721,180.

*To all whom it may concern:*

Be it known that we, RAYMOND J. HAVERTY and ANNIE ECKENROD, citizens of the United States, residing at 175 Washington avenue, Altoona, in the county of Blair and State of Pennsylvania, have invented certain new and useful Improvements in Kitchen Utensils, of which the following is a specification.

This invention relates to kitchen utensils and contemplates a combination tool adapted to be used either as a ladle holder or nutmeg grater, and when the assembly is complete the device can readily be used as a skimmer, jelly ladle, strainer or similar purpose.

Another object of this invention is to provide means for suspending the ladle body on the rim of a kettle which may contain a liquid suitable to be worked with a device of this type.

With these and many other objects in view, the invention consists of the novel construction, combination and arrangement of parts as will be hereinafter fully pointed out, illustrated and claimed.

The essential features of this invention are necessarily susceptible to a wide range of structural modification without departing from the spirit or scope of the invention, but a preferred and practical embodiment thereof is shown in the accompanying drawings, in which:—

Figure 1 shows our combination kitchen utensil attached to the rim of a stewing kettle. Fig. 2 shows an elevational view, together with an edge view, of the ladle adapted to be used in connection with the body as shown in Fig. 1 of the drawings. Fig. 3 is a plan and side view of the body of the kitchen utensil. Fig. 4 shows a cross section, taken on the line 4—4 of Fig. 3.

Like reference numerals designate corresponding parts throughout the several figures of the drawings.

This invention primarily consists of a combination kitchen utensil designated in its entirety by the numeral 10, and preferably consists of a body portion 11, to which is attached a handle 12, as clearly shown in Fig. 1 of the drawings.

The body 11 preferably consists of a concave portion 13, that may be provided with holes 13$^a$, and an upstanding inverted U shaped hook 14. The handle 12 is preferably made of tin or sheet iron with the edges 15, rolled over on the body 16, such that the sharp edge is covered, which, naturally, facilitates the handling thereof. The body 16 is also provided with a plurality of perforated projections 17 against which nutmegs, or similar articles may readily be grated for immediate use.

The bottom portion 18 of the handle 12, is preferably made U shaped, having a wing 19 adapted to be formed on one leg of the U and bent back over the edges 20, such that an inclosure or socket 21 is formed into which the leg 22 of the body 13 drops when the assembly is complete, as shown in Fig. 1 of the drawings.

The distinct advantage of this combination kitchen utensil can readily be seen by referring to Fig. 1 of the drawings.

It is obvious from the drawings that the kitchen utensil is readily adapted to fit over the rim of a kettle to which it is attached. This feature is specially commendable while preparing jellies, etc., in which it is often necessary to lay the usual form of ladle down and in so doing the excess jelly adheres to whatever it comes in contact with, which is not only disagreeable but insanitary. The ladle body is readily detached from the handle and another as easily attached.

From the foregoing it is thought that the many advantages of the hereindescribed combination kitchen utensil are readily apparent, and

What we claim and desire to be secured by Letters Patent is;—

1. A device of the character described comprising a handle member having lateral reinforcing ribs and doubled upon itself at one end to form a socket, and a ladle body having a hook adapted to enter the said socket and thereby detachably engage with the said handle member.

2. A device of the character described comprising a ladle body, a hook formed therefrom, and a handle member having laterally extending wings at one end, said end adapted to be bent upwardly and said wings adapted to be bent backwardly to engage the body of the handle member, thereby forming a socket to detachably receive the hook on the ladle body.

In testimony whereof we affix our signatures in presence of two witnesses.

RAYMOND J. HAVERTY.
ANNIE ECKENROD.

Witnesses:
 ELIZABETH BANE,
 JOSEPH ECKENROD.

Copies of this patent may be obtained for five cents each, by addressing the "Commissioner of Patents, Washington, D. C."